US009003383B2

(12) United States Patent
Lavallee et al.

(10) Patent No.: US 9,003,383 B2
(45) Date of Patent: Apr. 7, 2015

(54) ANALYTIC ENGINE TO PARALLELIZE SERIAL CODE

(75) Inventors: Ronald J. Lavallee, Belgrade, ME (US); Thomas C. Peacock, Bedford, NH (US)

(73) Assignee: You Know Solutions, LLC, Belgrade, ME (US)

( * ) Notice: Subject to any disclaimer, the term of this patent is extended or adjusted under 35 U.S.C. 154(b) by 265 days.

(21) Appl. No.: 13/507,499

(22) Filed: Jul. 5, 2012

(65) Prior Publication Data

US 2013/0074037 A1 Mar. 21, 2013

Related U.S. Application Data

(60) Provisional application No. 61/535,289, filed on Sep. 15, 2011.

(51) Int. Cl.
*G06F 9/45* (2006.01)

(52) U.S. Cl.
CPC ............... *G06F 8/456* (2013.01); *G06F 8/457* (2013.01)

(58) Field of Classification Search
USPC .............. 715/853; 717/106, 109, 3, 124, 130, 717/146, 148–149, 151, 157–159; 719/315; 714/724; 718/102; 700/18; 703/9, 22
See application file for complete search history.

(56) References Cited

U.S. PATENT DOCUMENTS

| | | | | |
|---|---|---|---|---|
| 5,758,160 A | * | 5/1998 | McInerney et al. | 717/104 |
| 6,341,371 B1 | * | 1/2002 | Tandri | 717/158 |
| 6,421,821 B1 | * | 7/2002 | Lavallee | 717/109 |
| 6,754,540 B1 | * | 6/2004 | McFarland et al. | 700/18 |
| 6,971,084 B2 | * | 11/2005 | Grey et al. | 717/106 |
| 7,617,082 B2 | * | 11/2009 | Childs et al. | 703/9 |
| 7,844,959 B2 | * | 11/2010 | Isard | 717/149 |
| 8,046,745 B2 | * | 10/2011 | Wong | 717/130 |
| 8,495,603 B2 | * | 7/2013 | Archer et al. | 717/149 |
| 8,527,971 B2 | * | 9/2013 | Helovuo | 717/149 |
| 2002/0007483 A1 | * | 1/2002 | Lopez | 717/3 |
| 2002/0162089 A1 | * | 10/2002 | Lewis et al. | 717/106 |

(Continued)

FOREIGN PATENT DOCUMENTS

WO WO 2009085118 A2 * 7/2009
WO WO 2010004474 A9 * 1/2011

OTHER PUBLICATIONS

Gasper, Pete, et al. "Automatic parallelization of sequential C code." Midwest Instruction and Computing Symposium, Duluth, MN, Usa. 2003.*

(Continued)

*Primary Examiner* — Lewis A Bullock, Jr.
*Assistant Examiner* — Gilles Kepnang
(74) *Attorney, Agent, or Firm* — Hayes Soloway PC

(57) ABSTRACT

The subject system provides the ability to parallelize pre-existing serial code by importing and encapsulating all of the serial code into an object orientated flowchart language utilizing an analytic engine so that the imported code can be efficiently executed taking advantage of the partially ordered transitive flowchart system. The importation examines the serial code to ascertain what elements may be processed under an atomic time to instantiate them as either Action or Test objects, whereas statements which require more than atomic time are instantiated as Task object, with the Action, Test and Task objects being processable by separate processors to establish parallel processing, or by the multitasking afforded by the partially ordered transitive flowchart system.

13 Claims, 4 Drawing Sheets

(56) References Cited

U.S. PATENT DOCUMENTS

| | | | |
|---|---|---|---|
| 2004/0078780 A1* | 4/2004 | Dutt et al. | 717/106 |
| 2004/0083468 A1* | 4/2004 | Ogawa et al. | 717/151 |
| 2004/0205718 A1* | 10/2004 | Reynders | 717/124 |
| 2005/0149908 A1* | 7/2005 | Klianev | 717/109 |
| 2005/0188364 A1* | 8/2005 | Cockx et al. | 717/159 |
| 2006/0005179 A1* | 1/2006 | Kawahara et al. | 717/157 |
| 2006/0036426 A1* | 2/2006 | Barr et al. | 703/22 |
| 2007/0226686 A1* | 9/2007 | Beardslee et al. | 717/109 |
| 2007/0234276 A1* | 10/2007 | Ottoni et al. | 717/104 |
| 2008/0134207 A1* | 6/2008 | Chamieh et al. | 719/315 |
| 2010/0023731 A1* | 1/2010 | Ito | 712/216 |
| 2010/0083185 A1* | 4/2010 | Sakai | 715/853 |
| 2010/0275189 A1* | 10/2010 | Cooke et al. | 717/146 |
| 2010/0325608 A1* | 12/2010 | Radigan | 717/106 |
| 2011/0067015 A1* | 3/2011 | Takagi et al. | 717/149 |
| 2011/0083125 A1* | 4/2011 | Komatsu et al. | 717/149 |
| 2011/0107162 A1* | 5/2011 | Martinez Canedo et al. | 714/724 |
| 2011/0113408 A1* | 5/2011 | Hamby et al. | 717/136 |
| 2011/0239201 A1* | 9/2011 | Vaidya et al. | 717/149 |
| 2011/0265067 A1* | 10/2011 | Schulte et al. | 717/148 |
| 2011/0302584 A1* | 12/2011 | Pingali et al. | 718/102 |
| 2012/0151460 A1* | 6/2012 | Joisha et al. | 717/149 |

OTHER PUBLICATIONS

Isard, Michael, et al. "Dryad: distributed data-parallel programs from sequential building blocks." ACM SIGOPS Operating Systems Review 41.3 (2007): 59-72.*

Bushehrian, Omid. "Automatic actor-based program partitioning." 2010. Journal of Zhejiang University Science C 11.1. pp. 45-55.*

* cited by examiner

ANALYTIC ENGINE TO PARALLELIZE SERIAL CODE

RELATED APPLICATIONS

This Application claims rights under 35 USC §119(e) from U.S. Application Ser. No. 61/535,289 filed Sep. 15, 2011, the contents of which are incorporated herein by reference.

FIELD OF THE INVENTION

This invention relates to the ability to parallelize preexisting serial code that is ordinarily executed in a distinct processor by importing and encapsulating all of the serial code into an object oriented flowchart language utilizing an analytic engine so that the imported code can be efficiently executed taking advantage of the partially ordered transitive flowchart system, called Flowpro.

BACKGROUND OF THE INVENTION

As described in a National Academy's publication entitled "The future of computing performance: Game over or next level?", the existence of a tremendous amount of sequential code such C, C++, Fortran, Java presents a large problem when one seeks to parallelize the code to permit parallel processing.

Today's microprocessors, executing sequential code, use multiple compute cores to achieve performance improvement. However, without parallel software there is a failure to realize the full performance potential that could be achieved using processors executing parallel code.

Presently flowchart programming systems utilizing object oriented programming such as described in U.S. Pat. No. 6,421,821 only allow serial code to be used as a macro block of serially executed code that is executed top to bottom in a separate thread, with no regard to parallelism or to the advantages of object oriented programs.

Thus the parallelism achievable with a partially ordered transitive flowchart system has heretofore been seen unusable to incorporate the large amounts of sequential code that has been written for various applications throughout different various industries.

For instance upwards of 20 different microprocessors operating each independently and programmed with their own independent sequential codes are used in an automobile to control various automobile functions. The amount of computational power required as well as time to execute all of the routines in each of these microprocessors has not been optimized so that the code written for these processors could be executed in a parallel fashion.

Thus, there are millions and millions of lines of preexisting sequential code that are used in the programming of these microprocessors which cannot quickly and reliably be converted for use in an object oriented format or divvied up amongst multiple processors to provide for parallel processing.

Note that the Flowpro system is a system for visualizing the operation of an object oriented program in which program function and parameters can be easily changed by changing the flowchart blocks or objects.

It is one of the features of the Flowpro system described in the above-mentioned patent that one can execute directly from the flowchart by merely creating the flowchart with various objects. Thereafter the code is executed in accordance with the flowchart.

It is also a primary feature of the Flowpro system that once the Flowpro flowcharts, are generated, the programmer can visualize the program, alter it and execute it.

This system has replaced the PLC ladder diagram programming system and made it easy to control machinery and the like by simply creating a flowchart with objects and various basic blocks and then executing based on executing the blocks in an optimized numeric order.

In the past if an entity wished to use the Flowpro flowcharts to execute code that was written in another language such as C, Pascal, Basic or the like, this code was brought in as a thread or macro and executed as a separate thread within the flowchart. In the past no attempt was made to import or encapsulate serial code per se into Flowpro blocks or objects. The flowcharts of the past would execute the flowchart objects until one got to the point where it would stop its execution to execute the serial code macro, with the macro running until the code finished or in a fixed timesliced fashion. Then the runtime would come back and execute the remaining flow chart objects in the normal manner.

It is noted that a routine that constituted a special routine in another language could not be handled within the flowchart language itself, except by handing off to a macro. Thus, the flowchart execution had to stop and wait for a macro execute itself before going on.

There was therefore a necessity to see if it was possible to import and encapsulate serial code into a Flowpro flowchart format without resorting to macros. The next problem was that once having imported and encapsulated arbitrary code into the Flowpro flowcharts, how could the result be used to generate parallel processing in multiple processors.

In short there is a necessity for an algorithm or methodology to analyze serial code and to create flowchart objects that can be parallelized by distributing so-called TASK objects and Flowpro flowcharts amongst multiple processors.

SUMMARY OF THE INVENTION

An analytic engine is used to break down arbitrary sequential code in terms of execution time of the code's statements and to use the result to create a scheme for parallel processing or multitasking. To do this the analytic engine imports arbitrary sequential code into a partially ordered transitive flowcharting system, referred to herein as the Flowpro system, to obtain the advantages of the Flowpro system. The advantages include the multi-tasking afforded by the Flowpro system as well as visualization of the sequential code in terms of flowcharts. As a result of the importation, not only are the multi-tasking advantages achieved, the resulting flowchart identifies opportunities for parallel processing in the serial code that may not have been evident otherwise.

The analytic engine examines the statements in the arbitrary code, by analyzing the execution times of the statements to ascertain what parallelism opportunities exist and implements the parallelism opportunities in the serial code. To do this, the analytic engine builds a cross reference table of data dependencies, makes flowchart element(s) from each statement a block, computes execution time for the associated element and uses this element execution time to determine what type of object, Action, Test or Task to encapsulate the code statements into based on a concept called "atomic" time. "Atomic" time is the maximum execution time allowed for any atomic path which is a path on which all the numbered elements, blocks or objects, are in ascending order. In so doing, one breaks up the arbitrary serial code into flowchart elements that can be multitasked or parallel processed, thus to provide parallelization for the arbitrary serial code.

Thus, the problem is that if one is executing already written or existing code that runs in a particular processor the question is how to take that code and parallelize and run it in for instance multiple processors so that one can take advantage of parallel processing.

Prior to describing the invention, it will be important to realize that the Flowpro system of executing object oriented programs involves at least three object types: A Test object which requires evaluation of an event question for which the answer is a "yes" or a "no", an Action object in which an event or function is performed and a Task object. As will be seen, all Flowpro Test and Action objects run in less than an execution time called "Flowpro atomic time" or just "atomic time". The Task object is one that primarily takes longer than atomic time to execute but in some cases can execute in one atomic time. Task objects that take greater than atomic time to execute will always contain a loop back element. A loop back is defined as executing elements, blocks or objects, in ascending order until the element executing goes down to an element number equal to or less than the number of the executing element number which ends the execution of the task on that scan. A scan is defined as executing the currently active atomic path in each active flowchart or task object once. A loop back terminates an atomic path. The scan rate or scan time will vary as a Flowpro program is running because different flowcharts and task objects will have various active atomic paths processed as the program executes.

It is important to understand the meaning of atomic time because it is important to understand that a Test object and an Action object are to be completed in less than atomic time, whereas Task objects are primarily executed in a time exceeding the atomic time.

Thus a Test object evaluation takes incoming information and comes out with an answer within an atomic time. An Action object is where an event or function is performed within an atomic time.

While atomic time theoretically can take place at the speed of light, this is not a practical limitation and in general whether the atomic time is a pico second, a nano second or a micro second, the atomic time is chosen to be able to analyze serial code in order to decode whether to encapsulate the particular code in a Test object, and Action object or a Task object.

Having broken down an arbitrary sequential code utilizing the above technique, the Task objects thus generated may be distributed amongst multiple processors to effectuate parallel processing of the preexisting serial code.

Thus in taking an arbitrary sequential code language and importing it into three types of objects, the flowcharting permits visualization of all of the parallel processing opportunities.

By enabling the analysis of an arbitrary sequential code program based on atomic execution times one can directly import arbitrary sequential code lines into flowchart objects so that the opportunities for parallel processing can be realized.

Thus, an arbitrary sequential code whose statements which take small amounts of time such as under an atomic time are directly encapsulatable into the object oriented flowcharting process, whereas those statements which take more than an arbitrary atomic time are placed in Task objects. The result is the benefit of Flowpro flowchart execution for arbitrary serial code and the ability to visualize the parallel process opportunities in the arbitrary serial code.

In order to understand the parallelism achievable by the subject invention and as further background into the Flowpro system, first, the Flowpro system is defined as a partially ordered transitive flowchart system related to element ordering as will be described. The partially ordered transitive flow chart system referred to herein as the Flowpro system.

The partially ordered transitive flow charting algorithm is as follows:

A Flowpro program consists of one or more flowcharts and each flowchart is considered a separate task that begins execution in what is referred to as the enable bubble. There are basic flowchart elements called blocks and flowchart elements called objects which can be a combination of blocks and other objects. Elements can be actions or tests or additional tasks. Actions and test elements happen instantaneously and task elements primarily do not. Once a flowchart is created consisting of block and object elements all elements on the flowchart are checked by the compiler to ensure that they have a flow line source from an element and a flow line destination to another element. The compiler then numbers (orders) the elements in an ascending (transitive) sequence starting with the number one element being connected to the enable bubble. Then the compiler continues numbering the elements by following the flow paths and numbering in such a way as to ensure that each element is numbered higher than all of the elements that flow to it. All flowcharts and objects are numbered in this way and each flowchart will be executed in the order that they are listed in a table. At execution time the first flowchart begins execution from the enable bubble following the flow lines in ascending element order until an element loops back to an equal or lower numbered element. Execution then moves to the next flowchart in the table and executes it until an element loops back to a equal or lower numbered element. This process is repeated for all flowcharts in the table. One execution through all flowcharts is referred to as a scan. The process is then repeated starting with the first flowchart in the list by picking up execution where it left off on the last scan and continues until there is a loop back. The next flowchart is then executed and so on. Scanning is continuous and is the equivalent to running the program.

The encapsulation rules are now presented.

Importation and Encapsulation of Computer Languages

The importation and encapsulation process is a multi-step procedure for developing flowchart representations of programmed logic written in other computer languages.

The first step interprets the imported logic statement by statement and creates a list of flowchart element representations of the code (Action, Test, Object elements). These created blocks are elements that will then be linked together based on possible execution sequences (paths) of the statements. The execution time of the logic for each statement will be determined and added to this stored element information. Segments of the imported code that constitute a sub-program (i.e. subroutines, functions, procedures, etc.) are encapsulated as separate Flowpro Task objects. Also while building the element list, a data dependency cross reference table, specifying the references to all variables and the type of actions performed, will be created to facilitate the determination of sequentiality requirements through the logic flow as the code is organized into flowchart objects.

The second step assigns temporary element numbers to the elements using the same logic as currently is used the Flowpro compiler, which is a partially-ordered transitive algorithm. This numbering ensures that every element is numbered higher than all the elements whose execution may precede its own execution.

The third step will then proceed through the linked list of elements and encapsulates statements in the imported logic based on the atomic time from an Execution Time Supervisor. It begins with the first statement in the imported code and continues along the numbered execution sequence summing the execution times, evaluating the effect of the element logic and examining the path flow as it determines how to proceed. The process begins with the evaluation of the first element created from the imported logic.

Element Evaluation

If this element is a Wait block—form an action object from the elements already in this encapsulation (if any) and begin a new encapsulation with the evaluation of the element following the Wait.

If this element has sources that will not be included in this current encapsulation—form a Task object from the elements already in this encapsulation and begin a new encapsulation with the evaluation of this element.

If the addition of the execution time for this element causes the summation to exceed the atomic time, form a task object from the elements already in this encapsulation and begin a new encapsulation with the evaluation of this element.

Add this element to the current encapsulation and add the execution time for this element to the accumulated time for the current encapsulation.

Path Determination

If this element just added to the encapsulation is a two-destination test and

If one of the destination paths points to an element within this encapsulation (including itself) and If the element on the other path is a higher-numbered element, continue the encapsulation by proceeding to the element evaluation of that element.

Otherwise form a test object from the elements already in this encapsulation and begin a new encapsulation with the lowest numbered element that is not already in an encapsulation.

If one of the destination paths points to an element that starts another already formed object and If the element on the other path is a higher-numbered element, form a Test object from the elements already in this encapsulation and begin a new encapsulation (without clearing the time summation) with the element evaluation of that element.

Otherwise form a Test object from the elements already in this encapsulation and begin a new encapsulation with the lowest numbered element that is not already in an encapsulation.

If both destination paths point to higher-numbered elements—Follow the paths of both destinations until they encounter a Wait block, exceed atomic time, loopback to an encapsulated element or converge to the same element, and If the paths converge, include all the elements along both paths in the current encapsulation and continue the encapsulation by proceeding to the element evaluation of the convergent element.

Otherwise form a Test object from the elements already in this encapsulation and begin a new encapsulation (without clearing the time summation) with the element evaluation of the lower numbered of the two elements.

If the destination of the element just added to the encapsulation is a higher-numbered element, continue the encapsulation by proceeding to the element evaluation of that element.

Otherwise form an Action object from the elements already in this encapsulation and begin a new encapsulation with the lowest numbered element that is not already in an encapsulation.

If the same variable that is set in one encapsulation is tested in another, then the sequencing of the objects must be preserved in the distribution of objects to multiple processors in a parallel execution environment.

Parallelism in the Flowpro System

Parallelism refers to having a parallel structure or having the appearance of being parallel. For instance, to an observer who is watching two lights blink on and off together, the observer cannot tell if there is a single processor controlling both lights or two separate processors each controlling a light. Parallel processing or parallel computing specifically refers to using more than one processor. Concurrency or Concurrent Computing, which is sometimes referred to as multitasking, is generally a term that is used in the context of a single processor but can apply to a multi-processor system. Parallelism is therefore exploiting concurrency and multitasking but can also refer to a multi-processor system. Flowpro is a fully integrated graphical software development and runtime system that exhibits the characteristics of visual parallelism and runtime concurrency with the potential for parallel processing.

As to past perceptions of flowcharts, Flowcharts are still used by many for documenting code, business procedures, quality procedures and UML V2.0 uses a variation of flowcharts in its Activity Diagrams. Many have written that flowcharts produce spaghetti code, use the dreaded "GO TO" and are therefore old-school. That was true, but there are four ways that partially ordered transitive flowcharts overcomes these problems.

First, as to GO TO Statements, with Flowpro the flowchart or flowcharts are the program and there is no conversion to another language. Since it is a graphical programming language a GO TO statement is simply a line leading from one element to another.

Secondly, most assume that there is one large flowchart that represents an application, but with Flowpro's parallelism there are many small flowcharts and flowchart objects making them easier to understand and reuse.

Thirdly, as to object oriented flowcharts, Flowpro's flowchart objects (U.S. Pat. No. 6,421,821) enhance software readability and reuse, while localizing variables, and further expose the parallelism of an application. With only three object types, Action Object, Test Object and Task Object, building objects is easy and straightforward.

Fourth partially ordered transitive flowcharts execute extremely fast and are not dependent on the graphical placement of flowchart elements but purely upon the flow lines connecting the flowchart elements. Task switch between flowcharts is not based on time but based upon the flow of events in each flowchart or flowchart object.

Flowpro's Structure

Element Ordering—All of the Flowpro flowchart elements (blocks, objects and blocks and objects within other objects) are numbered sequentially by following the flow lines and using a 'Partially Ordered Transitive' algorithm. That is to say when first numbering the elements, begin with the first element and then each element is numbered such that each is of a higher number than all of the numbered elements whose flow line lead to it with the exception of loop on itself or loop back. In the mathematical field of order theory this type of ordering is said to be atomic.

Flowcharts and Objects element execution—All elements are executed in a sequence that is determined by the flow lines. Evaluating all of the active elements in all flowcharts and Task Objects once is referred to as logic solve and when system overhead is included it is referred to as a scan. At execution time, whether a single processor or each processor in a multi processor system, Flowpro begins with the first of what may be many flowcharts or Task Objects in the application running in each processor. It executes the elements (blocks or objects) in ascending order following the flow lines until it loops back to an element of equal or lower number. It then stores that element number and switches to executing the next flowchart or Task Object beginning with the element number that it stored from the last scan. Action and Test blocks as well as Action and Test objects execute in an atomic programming fashion in which each flowchart path appears to execute in a single instant.

Flowpro Atomic Path is defined as a path on which all the numbered elements on that path are in ascending order.

Flowpro Atomic Time is defined as the Maximum Execution Time Allowed for any Flowchart Path. Note, instantaneous execution can have different values to different observers of a software and hardware application that is controlled by Flowpro. To most observers, ideally, instantaneous means zero time or conceptually 'the speed of light'. Microprocessors require a finite amount of time to execute program statements. In reality different applications can allow different definitions of instantaneous in a Flowpro application and yet Flowpro's atomic structure will be maintained. The Flowpro atomic time is set for each application and may be set to some fraction of the scan rate requirement for the application in order to achieve some measure of parallelism.

If the application has a fast scan rate then the atomic time will be set to a smaller value than if the scan rate requirement is for instance an order of magnitude lower. What this means is that the maximum parallelism being a function of atomic time means that for applications which have a slow scan rate requirement greater parallelism is achievable.

For instance in a machine control application a maximum scan rate of 20 ms is typical so a Flowpro Atomic Time of 0.02 ms or faster might be set and used by the analytical engine to calculate flowchart path execution times and generate a warning or error message. A radar system may require a scan rate of 20 μs and a Flowpro atomic time of 0.02 μs, yet a banking system may only require a scan rate of 200 ms. In all of these cases a minimum Flowpro atomic time must be achieved through more powerful hardware or more efficient software in order to maintain the parallelism that is explicitly shown in the Flowpro application flowcharts that are executing.

Continuous Scanning—As stated above the process of evaluating all of the active elements in all flowcharts and Task Objects and servicing overhead functions once is referred to as a scan. Within Flowpro this scanning process is continuous and cannot be interrupted under program control. This is an important point to keep in mind when interpreting Flowpro application flowcharts.

When a Flowpro application uses a parallel processing architecture all processors are scanning simultaneously and inter-processor communication happens in a 'partially ordered transitive' fashion.

In summary, the subject system provides the ability to parallelize pre-existing serial code by importing and encapsulating all of the serial code into an object orientated flowchart language utilizing an analytic engine so that the imported code can be efficiently executed taking advantage of the partially ordered transitive flowchart system. The importation examines the serial code to ascertain what elements may be processed under an atomic time to instantiate them as either Action or Test objects, whereas statements which require more than atomic time are instantiated as Task object, with the Action, Test and Task objects being processable by separate processors to establish parallel processing, or by the multitasking afforded by the partially ordered transitive flowchart system.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
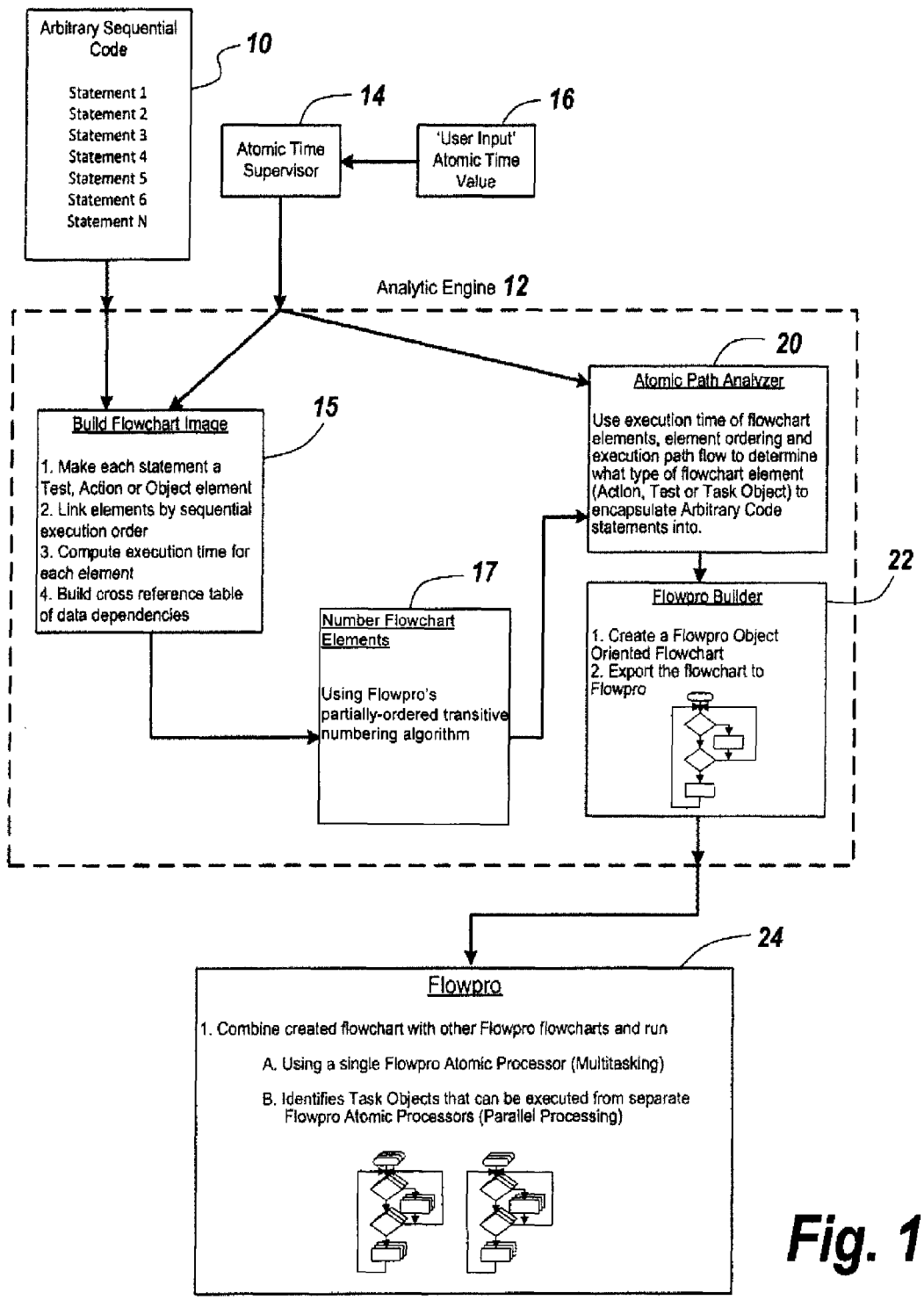
FIG. 1 is a block diagram a system for arbitrary sequential code import into a partially ordered transitive flowcharting system.

Flowpro's Parallelism and Concurrency Visualization Before describing the subject encapsulation system, parallelism in Three (YZ) & (X) Dimensions with the Flowpro system is now described.

In the YZ Dimensions, each flowchart in a Flowpro application can represent and execute parallelism in two dimensions which are the Y and Z dimensions. The Y dimension is the up, down, left or right on the page and the Z dimension is into the page. Certain 3D flowchart elements represent execution in the Z dimension while all other elements represent execution in the Y dimension. In the flowchart the flow path through the elements is atomic and therefore appears to execute instantaneously. In effect this means all elements execute in parallel since they happen in the same instant. A 3D rectangle, an Action Object, and represents a Z dimension atomic execution since it is an encapsulation of atomic elements within it, and in one embodiment may consist of many levels of atomic elements and has one exit but the action object itself executes in less than atomic time. A 3D diamond, a Test Object can represent a Z dimension atomic execution, may have many levels and has a YES and NO exit. In one embodiment all the flow paths are atomic and therefore all elements in each of these flow paths appear to execute in parallel. However, if one has a Start Task Object, a 3D oval, a Start Task Object, begins a non-atomic parallel execution thread in the Z dimension and an element checks if the task object is done (completed).

As to the X Dimension, when only one flowchart is used in a Flowpro application parallelism is not represented in the X dimension. The concept of execution in the X dimension requires that there be multiple flowcharts in the application either in a single processor or multiple processors each running multiple flowcharts.

As to concurrency execution, in Flowpro concurrency or concurrent programming is a scan-based method of executing all active flowchart elements in an entire application in a cooperative manner, whether executed from a single processor, or running in parallel on many processors. Cooperative means that in a single processor or each processor of a parallel system, each has its own local database memory. In a parallel system there is one shared global database that coordinates communications between processors. Concurrency also means that each task, Flowchart or Task Object, determines when to end its execution and pass execution on to the next task. The Flowpro system relies on its atomic ordering (element numbers) to determine when to end a task and where to pick up the next task. If we assume that on a current scan Flowchart 1 executed the flow path through elements 1, 2, 3, 4, 5 and assuming element 5 flows to element 1, a lower element number, a task switch will occur. By way of example, Flowchart 2 on the current scan is at element 7, a wait of 0.3 seconds has not expired, and the NO output of a decision flow loops on itself. As a result a task switch will occur. Assuming Flowchart 3 on the current scan is at element 11, a Task Object done that is not done. Because element 11 has the NO output of a decision loop on itself, a task switch will occur. In the above embodiment the Task Object that was started in element 10 will execute next according to the same rules until a task switch will occur. For a Flowchart N on the current scan this is at element 7, and the NO loops on itself. The result is that a task switch will occur. Flowchart 1 will pick up at element 1 and the scan process will be repeated and task switching will occur as dictated by the flow logic of all tasks in the application.

As to the subject analytic system, in order to provide for the subject parallelism a method is described for encapsulation, importation and parallel execution of arbitrary sequential code computer languages within a partially ordered transitive flowchart system.

In order to capture knowledge that is contained in other programming languages, i.e. such as Basic, C, C++, Fortran and Java, the following elements are part of the subject invention. First, these elements include an execution time supervisor, a compiler, an editor, a run time module, a de-bugger and a library manager.

The execution time supervisor is used to determine an input maximum atomic time execution time value for the compiler element. It also allows the user to adjust the load balance of the partially ordered flow charts that are executing on individual parallel processors. As noted above, the partially ordered transitive flowcharts and flowchart objects are defined U.S. Pat. No. 6,421,821 and rely on the fact that the entire flow chart system represents flow of events, not the flow of time. This permits concurrent execution of objects if the events permit.

The premise is that action and test objects do not take time to execute and task objects do. In reality all processors take a finite amount of time to execute low level and high level applications so there must be a notion of "zero time or the time for instantaneous transaction". Therefore the maximum atomic time is the upper bound of the field of "zero time or instantaneous transaction".

A scan is defined as executing the currently active atomic path in each active flowchart or task object once. A loop back terminates an atomic path. The scan rate (scan time) will vary as a Flowpro program is running because different flowcharts and task objects will have various active atomic paths processed as the program executes. Note that continually scanning is equivalent to running a program, and that Scan time is therefore the amount of time it takes to evaluate all of the active flowcharts and task objects once.

Analytic Engine

The analytic engine used to analyze the arbitrary sequential code language and build up partially ordered transitive flow charts from this arbitrary sequential code language is now described.

Referring to FIG. 1, what is shown is a block diagram of a system for importation of arbitrary sequential code import into a partially ordered transitive flowcharting system known as Flowpro. Here an arbitrary sequential code 10 involving a number of statements is coupled to an analytic engine 12 to which is coupled to atomic time supervisor 14, the atomic time being setable by a user input to a particular value as illustrated at 16. As discussed above, this atomic time is some fraction of a scan time and forms the upper limit of the processing time that can occur prior to determining that the execution of a statement cannot be done in the particular atomic time, at which point a Task object is created.

The processing of analytic engine 12 starts by building a flowchart image as illustrated at 15. This includes making each statement a Test, Action or Object element, followed by linking elements by sequential execution order, which is in turn followed by computing the execution time for each element and then building a cross reference table of data dependencies.

Having built up the flowchart elements, these elements are numbered as illustrated at 17 which numbers for the flowchart elements are assigned using the Flowpro partially-ordered transitive numbering algorithm.

Having numbered the flowchart elements, analytic engine 12 uses an automatic path analyzer 20 coupled to the atomic time supervisor and the numbered flowchart elements. The atomic path analyzer uses the execution time of flowchart elements, element ordering and execution path flow to determine what type of flowchart element, either Action, Test or Task object, is to be encapsulated from the arbitrary code statements.

As illustrated at 22 the output of the atomic path analyzer is exported to a Flowpro builder which creates a Flowpro object oriented flowchart and exports the flowchart to a flowchart processor 24. It is the purpose of this flowchart processor to combine created flowcharts with other Flowpro flowcharts and run the program using a single Flowpro atomic processor involving multitasking, or to identify Task objects that can be executed from separate processors to effectuate a parallel processing of the arbitrary sequential code.

Having imported the arbitrary sequential code into the Flowpro flowcharts one has flowcharts which immediately indicate those items which can be separately processed, thus to permit parallel processing.

Figure 2:
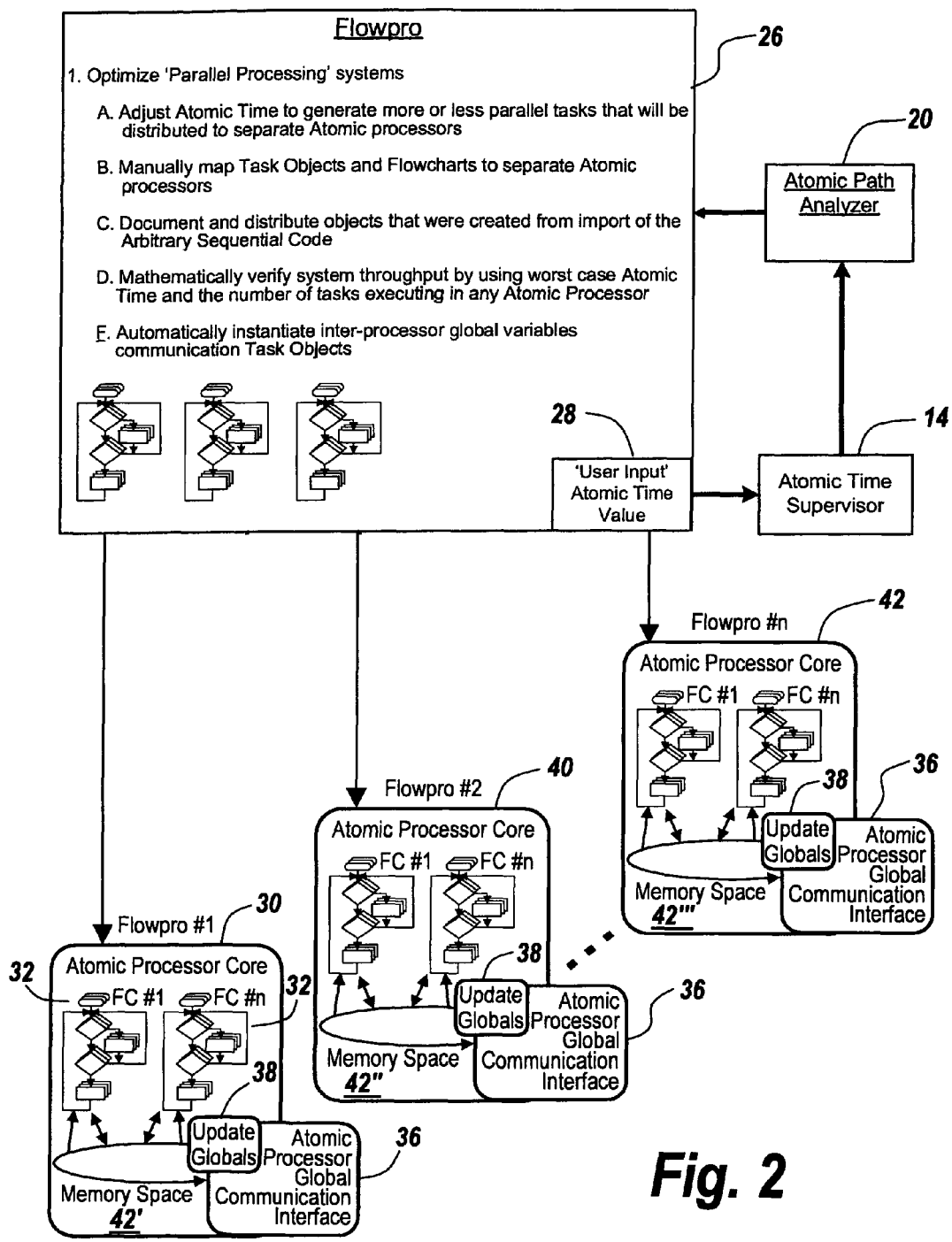
FIG. 2 is a block diagram showing the optimization of the Flowpro parallel processor system.

Referring now to FIG. 2, what is shown is the optimization of the Flowpro parallel processor system in which an optimization block 26 optimizes the parallel processing systems by first adjusting the atomic time to generate more or less parallel Tasks that will be distributed to separate atomic processors. The second step is to manually map Task objects and flowcharts to separate atomic processors, thereby assigning a separate processor to a Task object.

The third step is to document and distribute objects that were created from the import of the arbitrary sequential code into separate processors.

The next step is to mathematically verify the system throughput by using a worse case atomic time and the number of tasks executing in any atomic processor.

Finally, one automatically instantiates the inter-processor global variables communication Task objects.

As shown in block 26 there is a user input atomic time value, here illustrated at 28, that is applied to the atomic time supervisor 14 that is in turn coupled to the atomic path analyzer 20 described above.

What this means is that initial value of atomic time can be scrutinized to see if altering the atomic time value for a particular path can be adjusted to quicken the process.

As seen with respect to an atomic processor core 30 associated with Flowpro #1 is shown to contain a number of flowcharts 32 and 34 which are ported in memory space to an atomic processor global communication interface 36 that allows for global updates 38.

The same is true for atomic core processor 40, here labeled Flowpro #2, with this processor being replicated up to Flowpro #n, shown associated with atomic core processor 42. Note in this case that of the Flowpro atomic processor cores is associated with a different memory space here illustrated at 44', 44" and 44'".

Figure 3:
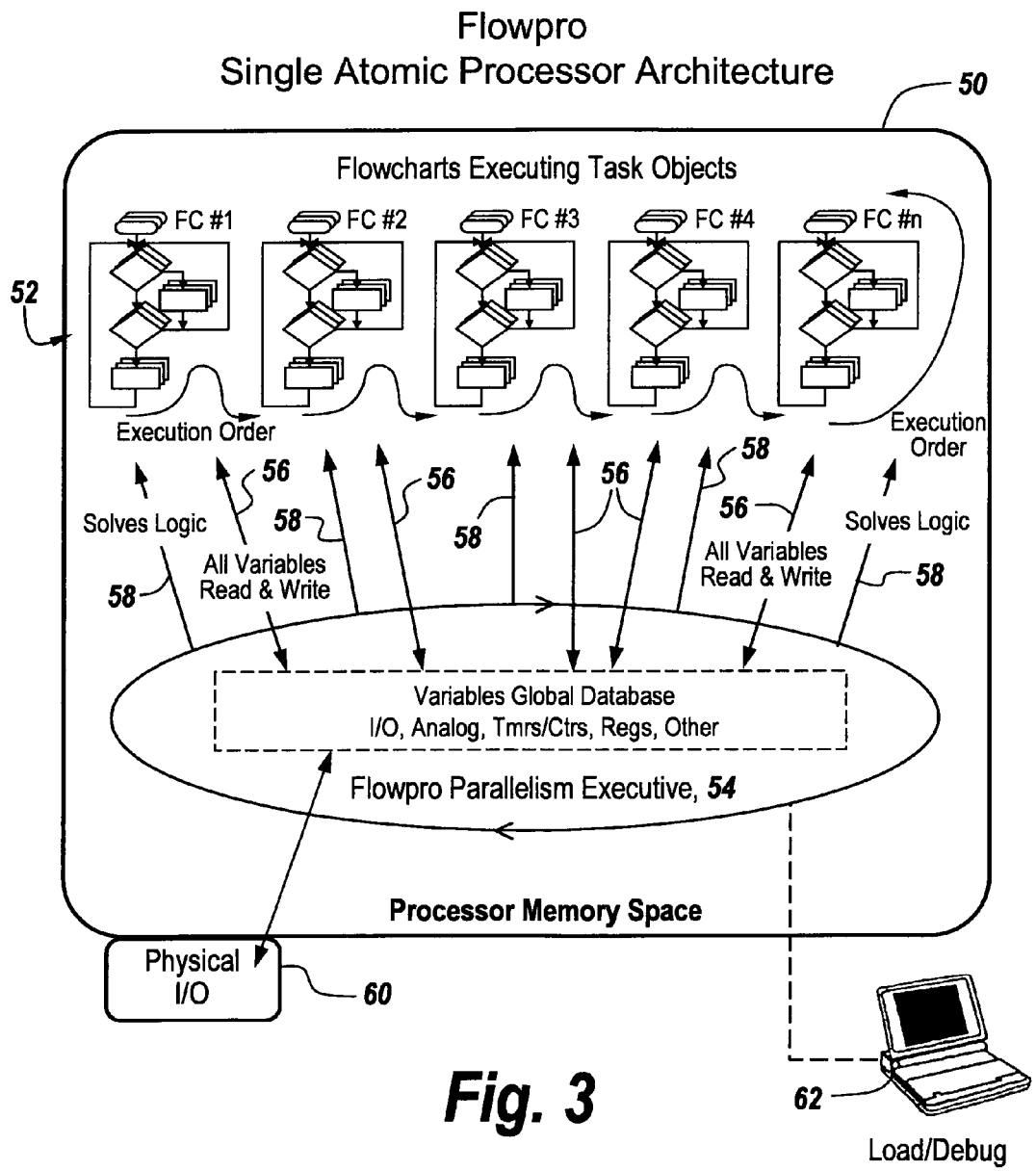
FIG. 3 is a diagrammatic illustration of the Flowpro single atomic processor architecture showing the execution order for a number of flowcharts; and, FIG. 4 is a diagrammatic illustration of the Flowpro parallel atomic processor architecture.

Referring now to FIG. 3, for a single processor architecture involving the atomic structure illustrated above, one can see that a processor 50 is shown executing flowcharts FC#1, FC#2, FC#3, FC#4 . . . FC#n as illustrated by arrow 52, with the execution order being as illustrated. Here it can be seen the Flowpro executive 54 includes variables global database I/O, Analog, Tmrs/Ctrs, Regs, and Other, with all variables read and written to the various flowcharts as illustrated by double-ended arrows 56.

Under control of the Flowpro parallelism executive 54 the execution occurs in terms of the logic solves illustrated by arrows 58, with block 50 representing processor memory space involving a physical I/O as illustrated at 60, with the memory associated with a computer 62 for loading and debug purposes.

What will be seen is that by breaking up the application into n flowcharts and executing sequentially one performs a type of multitasking whereby the execution of each flowchart is done under the atomic time. Therefore the application gives the appearance that the flowcharts are executing in parallel.

Figure 4:
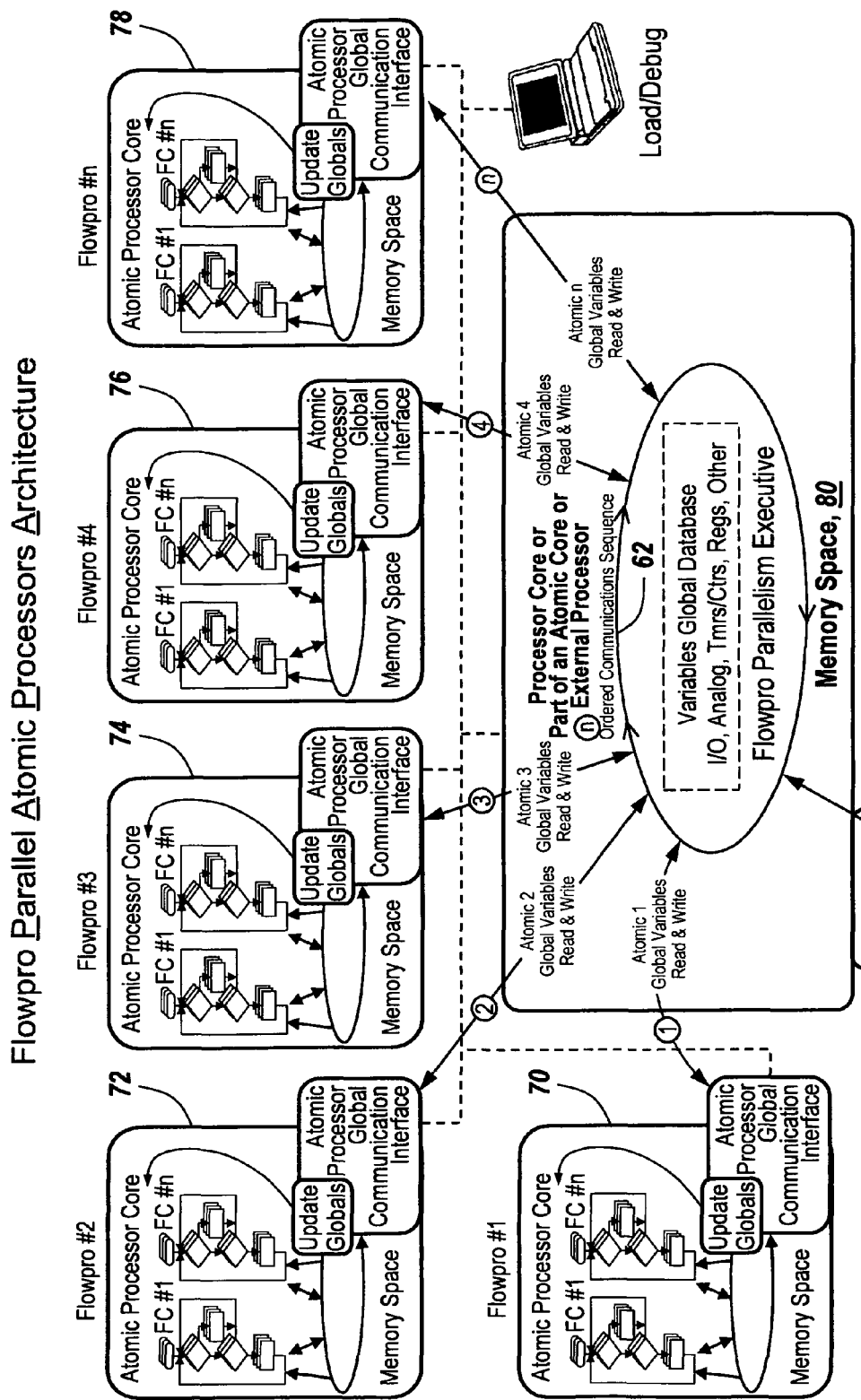

Aside from the multitasking shown in FIG. 3 is the opportunity to provide for parallel atomic processing is shown in FIG. 4 in which atomic processor cores 70, 72, 74, 76 and 78 run separate Tasks, all under the control of their own memory space 80 which contains the Flowpro parallel as the executive.

Once the flowchart elements have been generated by the subject system and assuming certain flowchart elements contain Tasks, each Task can be assigned to a different atomic processor core, assuming that each atomic processor core is provided with the associated global variables and the read and write instructions from memory space 80.

Thus it will be seen that while subject processing occurs in each of the atomic processor cores there is a shared memory space to establish parallel execution by servicing all of the processor cores, part of an atomic core or an external processor. However, each of the atomic processor cores is addressed in an ordered communications sequence as illustrated by arrows 82. The result is that the global variables are retained and are read into each of the atomic processor cores from a unified space, allowing each of the atomic core processors to operate independently for the appropriate parallel processing.

In operation of the analytic engine, the first step is for the analytic engine to interpret the imported logic statement by statement and to create a list of flowchart element representations of the code (action, test, object elements). These created blocks are elements that will then be linked together based on possible execution sequences (paths) of the statements. The execution time of the logic for each statement will be determined and added to this stored element information. Segments of the imported code that constitute a sub-program (i.e. subroutines, functions, procedures, etc.) are encapsulated as separate Flowpro Task objects. Also while building the element list, a data dependency cross reference table, specifying the references to all variables and the type of actions performed, is created to facilitate the determination of sequentiality requirements through the logic flow as the code is organized into flowchart objects.

The second step for the analytic engine is to assign temporary element numbers to the elements using the same logic as currently is used the Flowpro compiler, which is a partially-ordered transitive algorithm. This numbering ensures that every element is numbered higher than all the elements whose execution may precede its own execution.

The third step for the analytic engine is to then proceed through the linked list of elements and encapsulate statements in the imported logic based on the atomic time from the Execution Time Supervisor. It begins with the first statement in the imported code and continues along the numbered execution sequence summing the execution times, evaluating the effect of the element logic and examining the path flow as it determines how to proceed. The process begins with the evaluation of the first element created from the imported logic.

It then proceeds to evaluate elements and flow paths to insure that no encapsulation of an object allows an atomic path be created that will exceed the specified atomic time. It also ensures the integrity of the logic flow from the imported code, that is to say, any statement in the original code that may be initiated from multiple other statements will always be the first element in an encapsulation.

The analytic engine may also apply a unique identifier for each created flow chart object that can be used later to identify the certification status of each flow chart object.

An editor is used to create, configure, connect and flowchart elements consisting of low level blocks and high level objects. The editor can also be used to further aggregate flow chart objects and blocks.

A run time module is the executive code that runs the flowcharts according to partially ordered rules which execute the knowledge that is represented by the flowcharts. The run time also controls access to local and remote databases according to the same partially ordered rules.

As to a debugger, since the subject flowcharts execute to an absolute rule, execution paths, i.e. flowchart flow lines, at any time may be determined for any or all flowcharts and flowchart objects. The debugger will highlight the presently executing elements and present them so they may be observed by the user. The debugger is also used to monitor the state of variables and to provide run time statistics such as min, max and average scan time, number of objects executing and the loading of each processor at parallel hardware system.

Finally, a library manager is a repository created flow chart objects that allows the user to view, categorize, verify and add multimedia information by way of the stereotype handle referred to in U.S. Pat. No. 6,421,821 about each object.

Note that the execution time supervisor, analytic engine, editor and run time modules are necessary elements, with the debugger and library manager being optional.

As mentioned above, presently flowchart managing programming systems only allow the arbitrary other languages such as Basic, C, C++, Fortran and Java to be used within them only as a macro block of code. That is to say the arbitrary language code is imported as a sub-routine and is executed by the flowchart system as a sub-routine while blocking the flowchart flow, with no regard to the partially ordered transitive principals described in the above patent. In other words, the arbitrary language is simply executed top to bottom, usually with a separate thread, with no regard to whether any parallelism exists within this arbitrary sequential code.

In the subject invention parallelism is extracted from the arbitrary sequential code for parallelizing and for more efficient parallel execution.

It will be appreciated in creating flowchart objects from the arbitrary sequential code that this permits reuse of code and graphically shows the relationship between parallel objects.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A system including a processor and a memory for providing the ability to parallelize pre-existing arbitrary serial code involving one statement after another, the system further comprising:

an analytic engine for importing and encapsulating said pre-existing arbitrary serial code into a flowcharting system employing an object oriented flowchart language having a plurality of flowchart elements for flowcharting of said pre-existing arbitrary serial code, said analytic engine building a flowchart image by importing each statement of the pre-existing arbitrary serial code into execution paths of blocks wherein each path is an executing sequence of the statement blocks, said analytic engine further determining an execution time for each block, and building a cross-reference table of data dependencies, said analytic engine numbering each block of the pre-existing arbitrary serial code in ascending order by using a partially-ordered transitive numbering algorithm for which flowcharts can be generated from said pre-existing arbitrary serial code, said analytic engine being coupled to an atomic time supervisor, said atomic time supervisor receiving an atomic time, via user input, wherein the atomic time is the maximum execution time allowed for any execution path corresponding to each of the numbered blocks, said analytic engine ascertaining what flowchart elements may be processed under the atomic time provided by the atomic time supervisor, wherein the ascertaining of flowchart elements comprises:
determining whether the execution time for a particular block is under the atomic time;
in response to determining that the execution time is under the atomic time, assigning a particular block as either a flowchart Action object, representing a function to be performed, or a flowchart Test object, representing an evaluation of an event question;
in response to determining that the execution time is more than the atomic time, assigning a particular block as a flowchart Task object representing an object that can be executed from separate processors to effectuate a parallel processing of the pre-existing arbitrary serial code;

said analytic engine creating an exportable flowchart that includes the ascertained flowchart elements;

said analytic engine optimizing a parallel execution of the imported pre-existing arbitrary serial code by adjusting said atomic time to generate Tasks that are distributed to separate partially ordered transitive flowchart system processors, by mapping flowchart Task objects to said separate processors and mapping flowchart Action objects or flowchart Test objects to either the same or separate transitive flowchart system processors; and said analytic engine enabling the imported pre-existing arbitrary serial code to be efficiently executed by said flowcharting system in parallel.

2. The system of claim 1, wherein said analytic engine combines the flowcharts generated from the pre-existing arbitrary serial code into a single combined flowchart application from which parallel execution is performed, such that said analytic engine enables the imported pre-existing arbitrary serial code to be converted into said single combined flowchart application for of parallel execution due to the use of said object oriented flowchart language flowcharting system.

3. The system of claim 1, wherein only flowchart Task objects are processed by separate processors.

4. The system of claim 3, wherein said flowchart Action and said flowchart Test objects are processed only by a single processor operating with the partially ordered transitive flowchart algorithm, wherein multitasking capabilities of the single processor thereof provides parallelization of the flowchart Action and flowchart Test objects.

5. The system of claim 1, wherein said arbitrary serial code includes a number of statements and wherein said atomic time supervisor has as an input thereto an atomic time value, said arbitrary serial code and the output of said atomic time supervisor.

6. The system of claim 1, wherein said atomic time is a fraction of a scan.

7. The system of claim 6, wherein said scan is the time it takes to execute a currently active atomic path in each active flowchart Task object once.

8. The system of claim 1, wherein said analytic engine includes a processor for performing the numbering of each block of the pre-existing arbitrary serial code.

9. The system of claim 8, and further including an atomic path analyzer coupled to said atomic path supervisor, said atomic path analyzer using execution time of flowchart elements, element ordering and execution path flow to determine which type of flowchart element to encapsulate what types of statements into.

10. The system of claim 9, wherein said analytic engine includes a flowchart builder coupled to said atomic path analyzer to create an object oriented flowchart and for exporting said created flowchart.

11. The system of claim 10, and further including the partially ordered transitive flowchart system processor is coupled to said flowchart builder for running said exported flowchart using a single partially ordered transitive flowchart system processor for multitasking or for identifying flowchart Task objects that can be executed in separate partially-ordered transitive flowchart system processors to effectuate parallel processing.

12. The system of claim 11, and further including a distributer for distributing identified flowchart Task objects to separate partially-ordered transitive flowchart system processors.

13. A method for providing the ability to parallelize pre-existing arbitrary serial code involving one statement after another, in order to permit parallel processing or multi-tasking, the method comprising steps for:

providing an analytic engine, said analytic engine importing and encapsulating said pre-existing arbitrary serial code into a flowcharting system employing an object oriented flowchart language having a plurality of flowchart elements for flowcharting of said pre-existing arbitrary serial code, wherein said pre-existing arbitrary serial code involves one statement after another;

providing an atomic time supervisor which is controlled by a user-input atomic time value, wherein the user-input atomic time value is the maximum execution time allowed for any execution path corresponding to said pre-existing arbitrary serial code;

building a flowchart image, by said analytic engine, from said pre-existing arbitrary serial code in conjunction with the atomic time supervisor, wherein building the flowchart image comprises:

importing each statement of said pre-existing arbitrary serial code into execution paths of blocks, wherein each path is an executing sequence of the statement blocks;

determining an execution time for each block; and building a cross-reference table of data dependencies;

numbering, by said analytic engine, each block of said pre-existing arbitrary serial code in ascending order by using a partially-ordered transitive numbering algorithm for which flowcharts can be generated from said pre-existing arbitrary serial code;

ascertaining, by said analytic engine, what flowchart elements may be processed under the user-input atomic time value provided by the atomic time supervisor, wherein the ascertaining of flowchart elements comprises:

determining whether the execution time for a particular block is under the user-input atomic time value;

in response to determining that the execution time is under the user-input atomic time value, assigning a particular block as either a flowchart Action object, representing a function to be performed, or a flowchart Test object, representing an evaluation of an event question; and in response to determining that the execution time is more than the user-input atomic time value, assigning a particular block as a flowchart Task object representing an object that can be executed from separate processors to effectuate a parallel processing of the pre-existing arbitrary serial code;

creating a combined object oriented flowchart from the encapsulated pre-existing arbitrary serial code statements, the combined object oriented flowchart including the ascertained flowchart elements;

exporting the combined flowchart to a flowchart execution engine; and running the combined flowchart using a single atomic processor for multi-tasking or identifying task objects that can be executed from separate atomic processes for parallel processing wherein the running further comprises optimizing, by said analytic engine, a parallel execution of the imported pre-existing arbitrary serial code by adjusting said atomic time to generate Tasks that are distributed to separate partially ordered transitive flowchart system processors, by mapping flowchart Task objects to said separate processors and mapping flowchart Action objects or flowchart Test objects to either the same or separate transitive flowchart system processors.

* * * * *

UNITED STATES PATENT AND TRADEMARK OFFICE
CERTIFICATE OF CORRECTION

| | | |
|---|---|---|
| PATENT NO. | : 9,003,383 B2 | Page 1 of 1 |
| APPLICATION NO. | : 13/507499 | |
| DATED | : April 7, 2015 | |
| INVENTOR(S) | : Ronald J. Lavallee | |

It is certified that error appears in the above-identified patent and that said Letters Patent is hereby corrected as shown below:

In the Claims

Col. 14, Claim 2, Line 10, delete "of" after -- for --.

Signed and Sealed this
First Day of September, 2015

Michelle K. Lee
*Director of the United States Patent and Trademark Office*